May 7, 1929. J. M. BROPHY 1,712,328
AUTOMATIC HAMMER DOG
Filed Oct. 9, 1926  4 Sheets-Sheet 1

JAMES M. BROPHY
Inventor
By C. A. Snow & Co.
Attorneys.

May 7, 1929. J. M. BROPHY 1,712,328
AUTOMATIC HAMMER DOG
Filed Oct. 9, 1926 4 Sheets-Sheet 2

JAMES M. BROPHY
Inventor
By C. A. Snow & Co.
Attorney

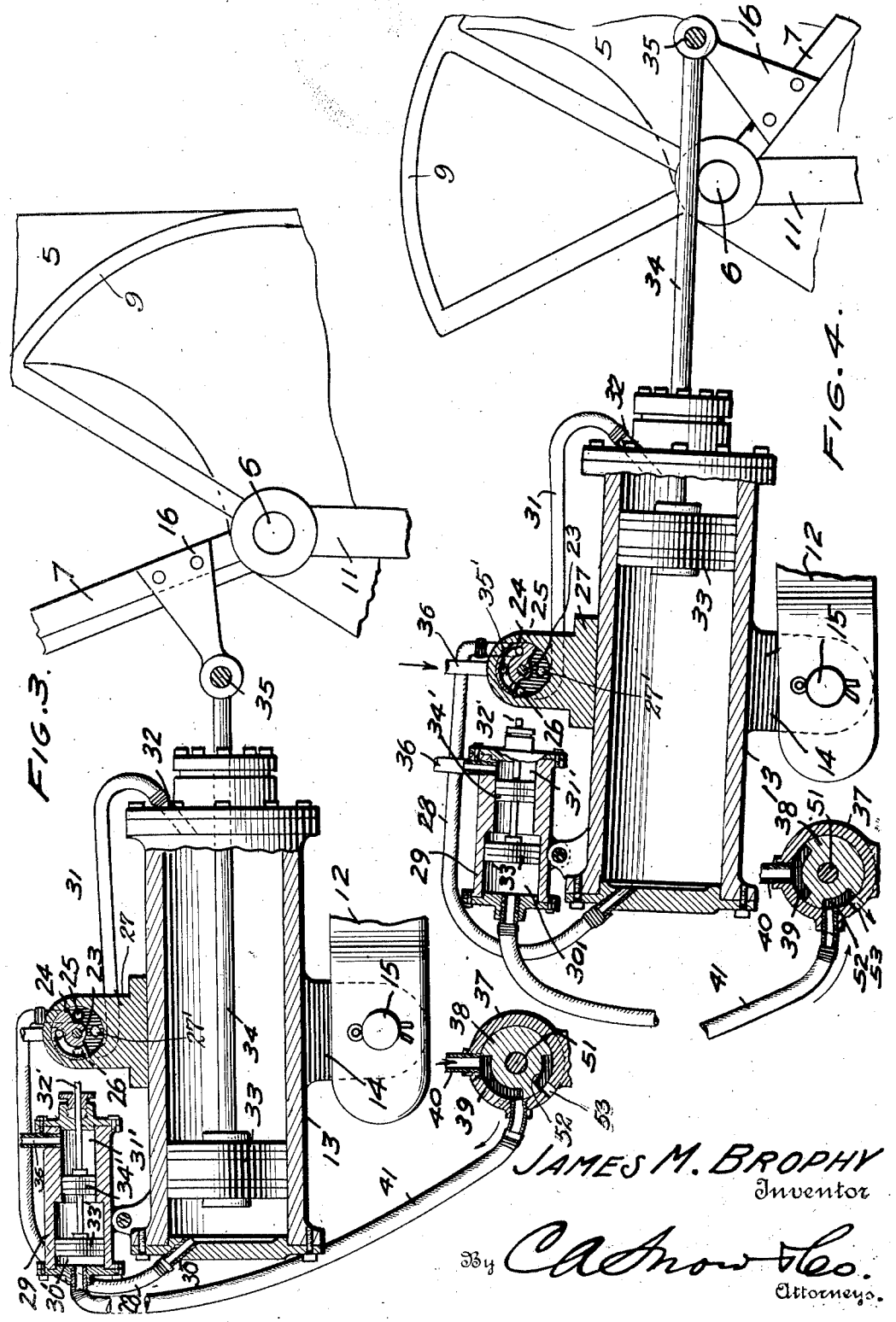

May 7, 1929.   J. M. BROPHY   1,712,328
AUTOMATIC HAMMER DOG
Filed Oct. 9, 1926   4 Sheets-Sheet 4
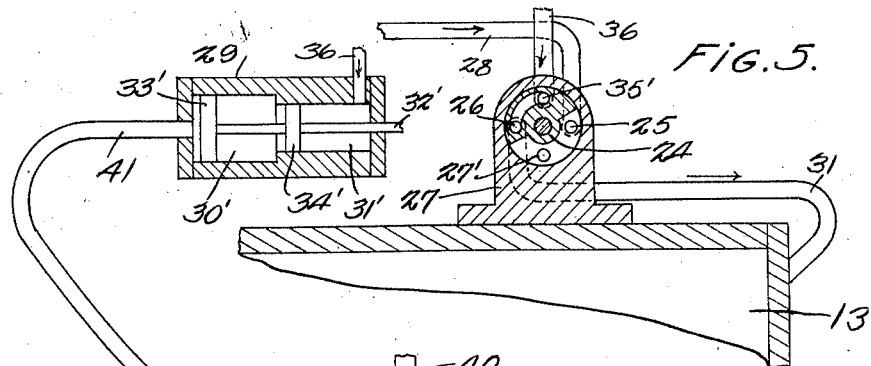
FIG. 5.
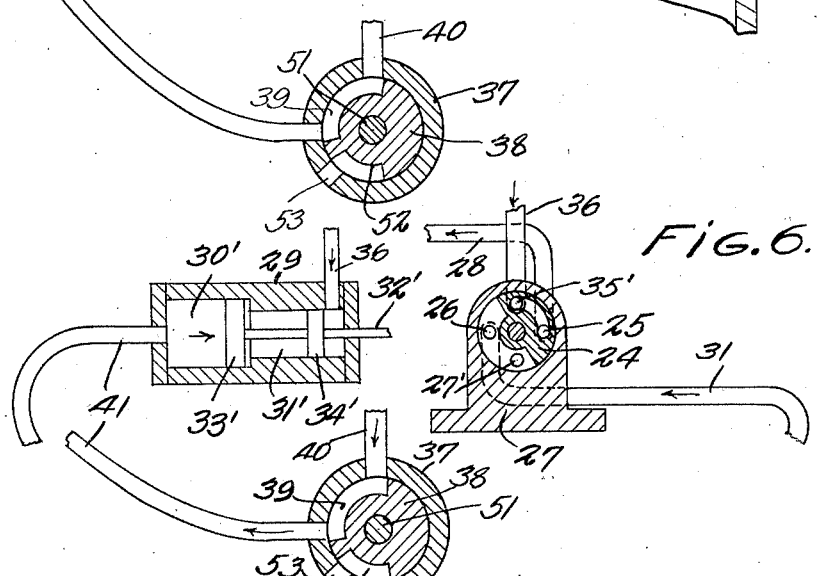
FIG. 6.
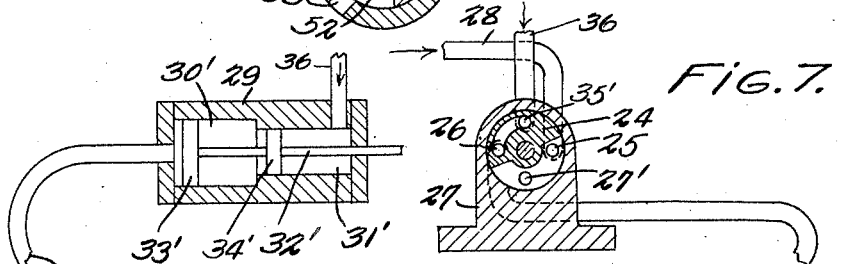
FIG. 7.
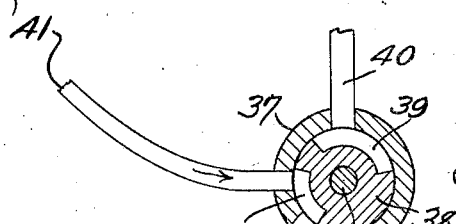
JAMES M. BROPHY,
Inventor,
By CA Snow & Co.
Attorneys.

Patented May 7, 1929.

1,712,328

UNITED STATES PATENT OFFICE.

JAMES M. BROPHY, OF HATTIESBURG, MISSISSIPPI, ASSIGNOR TO BROPHY AUTOMATIC AIR DOG CORPORATION, OF HATTIESBURG, MISSISSIPPI.

AUTOMATIC HAMMER DOG.

Application filed October 9, 1926. Serial No. 140,617.

This invention relates to an automatic hammer dog designed primarily for use in connection with the grab dog mechanism disclosed in my Patent Number 1,625,240 dated April 19, 1927. In the patented structure the knees are retracted along the headblocks and when a log or cant is brought against the knees, it actuates a plate adjacent the knees, the said plate being connected operatively to a valve which, in turn, controls the flow of air under pressure to mechanism designed to operate the grab dogs.

It is an object of the invention to provide a hammer dog for use primarily, though not necessarily, in connection with knees having grab dogs such as covered in my patent heretofore mentioned, means being employed for shifting the hammer dog into engagement with a log and to maintain its engagement until said dog comes to a point close to the line of cut by the saw of the mill at which time the hammer dog will be automatically shifted out of active position so that there will be no danger of its coming into contact with the saw.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 3 is a section through the valve and piston mechanism employed for controlling the actuation of the hammer dog, a portion of said hammer dog being shown in raised position and the valve and piston mechanism being shown in the positions occupied thereby before air under pressure is directed thereinto for the purpose of shifting the hammer dog away from its raised position.

Figure 4 is a view similar to Figure 3 showing the relative positions of the parts after the hammer dog has been shifted downwardly to active position.

Figure 5 is a view in diagram showing the relative positions of the valves before air under pressure is directed into the controlling valve, all of the parts being in their normal positions.

Figure 6 is a view similar to Figure 5 showing the relative positions of the valves after pressure has been directed into the controlling valve and the hammer dog has been swung downwardly to log engaging position.

Figure 7 is a view similar to Figure 6 showing the relative positions of the parts after the controlling valve has been shifted automatically to cut off pressure to the other valves, thereby to automatically return the hammer dog to its normal or inactive position.

Figure 1:
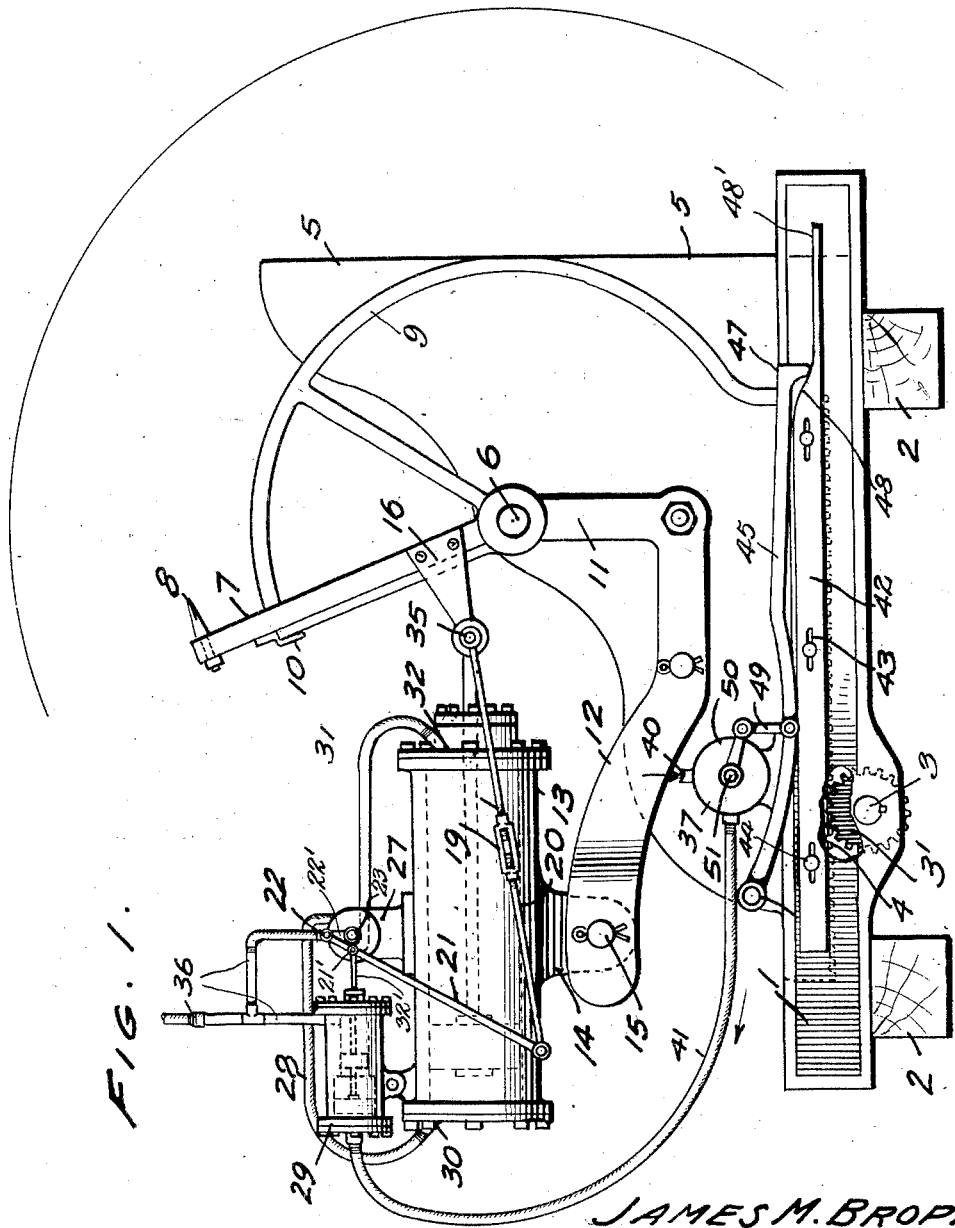
Figure 1 is an elevation of a knee and a portion of a carriage, a hammer dog such as constitutes the present invention being shown associated therewith and in raised or inactive position.

Referring to the figures by characters of reference 1 designates a head-block of a saw mill carriage a portion of which has been indicated at 2, it being understood that this carriage is adapted to be moved back and forth along lines parallel with the line of cut by the saw of a mill, thereby to feed a log or cant longitudinally against the saw. As the foregoing arrangement and operation is well known in the art to which this invention relates it is not deemed necessary to illustrate the carriage or the saw.

Journaled within the head-block 1 is a shaft 3 extending longitudinally of the carriage and provided with a gear 3' meshing with a rack 4 extending longitudinally of the headblock 1. This rack is carried by a knee 5 and obviously by rotating shaft 3 the gear 3' and rack 4 will cause the knee 5 to slide along the head-block transversely of the carriage. The number of knees employed on the carriage will vary but each knee will be provided with a gear 3' and a rack 4 so that all of the knees can be actuated simultaneously by the shaft 3 for the purpose of feeding a log laterally relative to the line of cut by the saw of the mill.

A bearing pin 6 is carried by the knee and mounted to swing thereon is a hammer dog 7 provided at its free end with the usual spike 8. An arcuate guide frame 9 is secured to the head-block and knee and is concentric with the pin 6, this guide frame being slidably engaged by a guide finger 10 carried by the dog 9. Extending downwardly from the pin or shaft 6 is an arm 11 that constitutes a part of the frame 9, this arm being formed with a rearwardly extending portion 12 held fixedly to the knee by any suitable means. Cylinder 13 is mounted above the extension 12 and is connected thereto by an ear 14 which is held to the extension by a pin 15. Thus the cylinder is mounted to rock relative to the extension 12. In one end of the cylinder there is provided a port 30 while in the other end is provided a port 32. A piston 33 is mounted for reciprocation in the cylinder and has a rod 34 pivotally connected at 35 to an arm 16 extending from the hammer dog 7 at a point adjacent the pivot 6 thereof.

Pivotally mounted on the cylinder 13 is the cylinder 29 of a piston valve. As shown particularly in Figures 3 and 4 this cylinder is provided in one end portion with a large bore 30' while in the other end is a smaller bore 31'. A piston 33' is mounted for reciprocation in the large bore 30' while a smaller piston 34' is mounted for reciprocation within the smaller bore 31'. The two pistons 33' and 34' are connected by a rod 32' one end portion of which projects from the cylinder 29 and is pivotally attached at 21' to a floating lever 21 having a short arm and a long arm. The short arm of this lever is pivotally connected at 22 to a crank arm 22' fixedly connected to and adapted to rotate with the stem 23 of a reversing valve 24. This valve is housed within a casing 27 mounted on the cylinder 13. In this casing are provided spaced ports 25 and 26. The port 25 is connected by a pipe 28 to the port 30 in cylinder 13 while port 26 is connected by a pipe 31 to the port 32 in said cylinder. Between these ports is located a pressure inlet port 35' and opening into this port 35' is one terminal of a forked pressure supply pipe 36 the other terminal of which opens into the small bore 31' of cylinder 29. The supply of air under pressure to the pipe 36 is constant and, therefore, there is a constant supply of air under pressure in the small bore 31' and in the port 35'.

The reversing valve 24 is so shaped that, when it is in its normal position, it maintains communication between the port 35' and the port 26 so that this pressure is thus directed through pipe 31 into cylinder 13 for the purpose of holding piston 33 in the position shown in Figure 3 with the hammer dog 7 raised. While the valve is in this position it also maintains communication between the port 25 and a suitably located exhaust port 27'. When the valve 24 is shifted to its other extreme position the ports 35' and 25 will be placed in communication with each other and port 26 with port 27'.

The free end of the floating lever 21 is connected by a link 20 to the pivot 35, there being, preferably, suitable means, such as a turnbuckle 19 for varying the length of the link.

Mounted on the knee 5 is the casing 37 of a controlling valve 38. This controlling valve has a stem 51 one end of which projects beyond the casing and to the stem is secured a crank arm 50. Casing 37 has a pipe 40 opening thereinto and adapted to direct air under pressure into the casing. Another pipe 41 connects this casing 37 to one end of the cylinder 29, said pipe opening into the large bore 30' back of the piston 33'.

The controlling valve 38 is so constructed as normally to maintain communication between the pressure pipe 40 and the pipe 41 as shown in Figures 3 and 5 a passage or recess 39 being provided in the valve for this purpose. Another passage or recess 52 is provided in the valve 38 for establishing communication between the pipe 41 and an exhaust port 53 formed in the casing 37. As shown in Figures 4 and 7 this exhaust port communicates with pipe 41 only when communication is broken between the pipes 40 and 41.

Pivotally connected to the knee 5 at 46 so as to move therewith is a tripping lever 45, an intermediate portion of which is connected to the crank arm 50 by a link 49. This tripping lever has a foot 47 at its free end adapted to ride on a controlling bar 42 in which may be formed longitudinal slots 43 for the reception of clamping bolts 44. The bar 42 is reduced in height adjacent one end so as to provide a rounded shoulder 48 which merges into a relatively thin tongue 48'.

Figure 2:
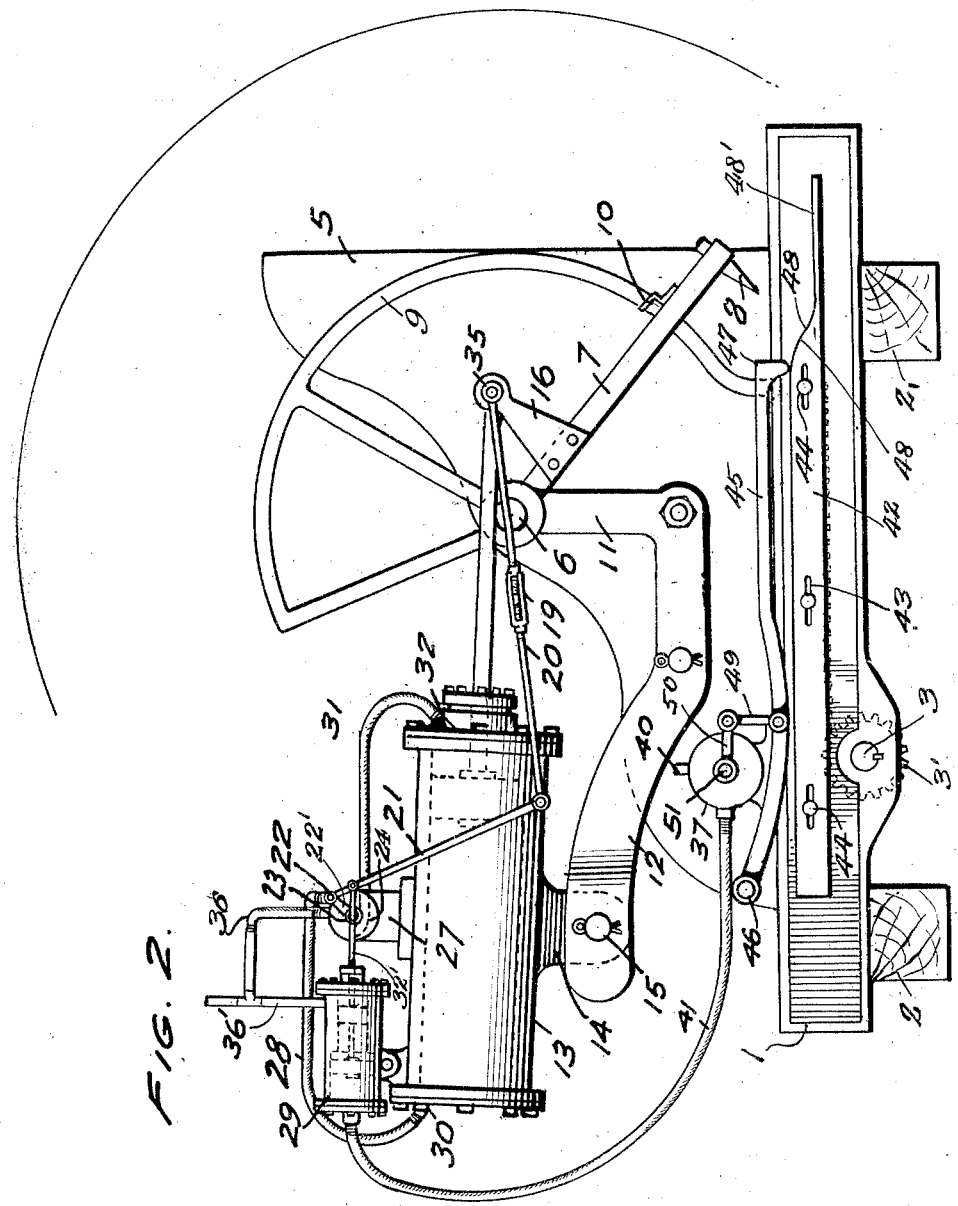
Figure 2 is a similar view showing the knee shifted toward the left from the position shown in Figure 1 and the hammer dog in its lowermost position.

Under normal conditions the knee 5 is shifted to the left from the position shown in Figure 1 and a desired distance past the position shown in Figure 2. During this movement, which is effected by rotating gear 3' to slide the rack 4, the foot 47 is lifted by sliding contact with the shoulder 48, thereby causing the lever 45 to thrust through the link 49 against the crank arm 50 and move the controlling valve 38 to the position shown in Figures 3 and 5. Ordinarily there is no pressure in the pipe 40 and, therefore, this movement of valve 38 will not produce any immediate result. As there is constant pressure in the pipe 36 the piston valve in cylinder 29 will be maintained in its extreme left position as shown in Figure 3 and the piston 33 will be maintained in its extreme left position as shown in said figure, these two positions of the pistons being maintained by reason of the air pressure from pipe 36 against piston 34' and from pipe 36 through valve 24 and pipe 31.

Any suitable means may be provided for directing pressure into the pipe 40 when a log or cant (not shown) is brought to position against the knee 5. If grab dogs are used as shown in my patent hereinbefore mentioned the pressure of the log or cant against a part of the grab dog mechanism will result in the flow of air under pressure to a mechanism for actuating the grab dogs. Where such a mechanism is employed the pipe 40 can be so connected thereto as to receive air under pressure simultaneously with the actuation of the grab dogs. Under other conditions, however, a suitably located valve operated by hand or otherwise can be employed for directing air under pressure into the pipe 40. No matter in what way the flow of air is controlled to the pipe 40, as soon as the air under pressure is admitted to the valve casing 37 while the controlling valve 38 is in its normal position as shown in Figures 1 and 3, air under pressure will flow from pipe 40 to pipe 41 and force the reversing piston valve longitudinally within cylinder 29 from the position shown in Figures 3 and 5 to the position shown in Figure 6. As the floating lever 21 is restrained by the link 20, the movement of the piston valve in cylinder 29 will cause the rod 32' to thrust against said lever 21 and swing it so as to pull on crank arm 22'. This movement will be sufficient to shift the reversing valve from the position shown in Figure 5 into the position shown in Figure 6. Consequently port 35' will be placed in communication with port 25 while port 26 will be placed in communication with exhaust port 27'. Thus air under pressure in the pipe 36 will flow from port 35' to port 25 and thence through pipe 28 to the left end of cylinder 13 where it will enter through the port 30. Piston 33 will be shifted by this air under pressure so as to move toward the right end of the cylinder 13 until it reaches the position shown in Figure 4. Obviously this movement will cause the hammer dog 7 to swing downwardly to active position where it will engage the log and hold it firmly.

With the parts located as described the knee 5 is adjusted toward the right in Figure 2 so as to properly position the log or cant where it will be cut by the saw when the carriage is moved relative thereto. After each cut longitudinally of the log the knee is shifted toward the right by any suitable means actuating the gear 3' so that a board or timber of desired thickness can be cut from the log. Each time the knee is thus shifted to the right the foot 47 comes closer to the shoulder 48 and when the log has been brought to a position where the hammer dog is close to the line of cut to be made by the saw, the foot 47 will slide downwardly on the shoulder 48 to the position shown in Figure 1. The weight of the controlling lever 45 will be sufficient to pull through link 49 on crank arm 50 and shift valve 38 from the position shown in Figures 3 and 5 to the position shown in Figures 4 and 7. This action brings the pipe 41 into communication with the exhaust port 53 and closes communication between the pressure pipe 40 and pipe 41. Consequently air is free to exhaust from behind piston 33' and the constant pressure in pipe 36 against piston 34' will be sufficient to shift the pistons 33' and 34' to the left so that rod 32', in acting on the floating lever 21 and crank arm 22', will move the valve 24 back to its initial position. This will place port 35' in comunication with port 26 so that air under pressure will flow through pipe 31 into cylinder 13 and thrust piston 33 to the left, thereby raising the hammer dog to inactive position where it cannot be hit by the saw during further cuts into the log. As the port 25 is in communication with the exhaust port 27' at this time, air in the path of the piston 33 will be free to escape. After the cutting of the log has been completed the supply of air under pressure to the pipe 40 can be cut off by hand or, if preferred, automatically as in my patent mentioned. The knee 5 can then be returned toward the left from the position shown in Figure 1 to a position at or beyond that shown in Figure 2 whereupon valve 38 will be returned to its initial position shown in Figures 3 and 5 at which time the parts are all reset and ready for another charge of air under pressure to be directed through pipe 40 into the valve casing 37 at the proper time.

I claim:

1. A saw mill hammer dog actuating mechanism including a knee, a hammer dog pivotally mounted on the knee, a cylinder, a piston and rod movable in the cylinder, said rod having connection with the cylinder and hammer dog to move the saw mill hammer dog when the piston moves, a valve for controlling the passage of fluid under pressure to the cylinder, a cylinder, pistons in the last mentioned cylinder and adapted to control the movements of the valve, a valve for controlling the passage of fluid under pressure to the last mentioned cylinder, an adjustable bar mounted adjacent to the knee, said bar having a cam surface, an arm having a head adapted to move over the cam surface, and means for connecting the last mentioned arm and last mentioned valve to operate the last mentioned valve upon movement of the arm.

2. The combination with a saw mill carriage, of a hammer dog for holding a log thereto, means for feeding the dog and the held log laterally relative to the path of movement of the carriage and for retracting the dog, and fluid pressure operated means controlled by said lateral feeding movement of the dog for withdrawing the dog from the log when advanced laterally to a predetermined position.

3. The combination with a saw mill carriage, of a hammer dog for holding a log thereto, means for feeding the dog and the held log laterally relative to the path of movement of the carriage and for retracting the dog, and fluid pressure operated means controlled by said lateral feeding movement of the dog for withdrawing the dog from the log when advanced laterally to a predetermined position and rendered inoperative to again advance the dog while the dog is at or in advance of said position.

4. The combination with a saw mill carriage, of a hammer dog for holding a log thereto, means for feeding the dog and the held log laterally relative to the path of movement of the carriage and for retracting the dog, and fluid pressure operated means controlled by said lateral feeding movement of the dog for withdrawing the dog from the log when advanced laterally to a predetermined position and rendered inoperative to again advance the dog while the dog is at or in advance of said position, the lateral retraction of said fluid pressure operated means operating to return said means to operative condition.

5. The combination with a saw mill carriage, of a knee on the carriage, means for advancing and retracting the knee laterally relative to the path of movement of the carriage, a dog movable with the knee, and fluid pressure operated means controlled by the lateral feeding movement of the knee, for shifting the dog to inactive position when advanced laterally with the knee to a predetermined position.

6. The combination with a saw mill carriage, of a knee on the carriage, means for advancing and retracting the knee laterally relative to the path of movement of the carriage, a dog movable with the knee, and fluid pressure operated means controlled by the lateral feeding movement of the knee, for shifting the dog to inactive position when advanced laterally with the knee to a predetermined position and rendered inoperative to again advance the dog while the dog is at or in advance of said position.

7. The combination with a saw mill carriage, of a knee on the carriage, means for advancing and retracting the knee laterally relative to the path of movement of the carriage, a dog movable with the knee, and fluid pressure operated means controlled by the lateral feeding movement of the knee, for shifting the dog to inactive position when advanced laterally with the knee to a predetermined position and rendered inoperative to again advance the dog while the dog is at or in advance of said position, the lateral retraction of said knee and dog operating to return the fluid pressure operated means to operative condition.

8. The combination with a saw mill carriage, of a knee carried thereby, means for feeding and retracting the knee laterally relative to the path of movement of the carriage, a hammer dog movably supported on the knee, fluid pressure operated means under the control of an operator for shifting the hammer dog into engagement with a log adjacent to the knee, means operated by the lateral feeding movement of the knee for reversing the direction of pressure upon said pressure operated means thereby to withdraw the hammer dog from the engaged log when advanced laterally to a predetermined position.

9. The combination with a saw mill carriage, of a knee carried thereby, means for feeding and retracting the knee laterally relative to the path of movement of the carriage, a hammer dog movably supported on the knee, fluid pressure operated means under the control of an operator for shifting the hammer dog into engagement with a log adjacent to the knee, means operated by the lateral feeding movement of the knee for reversing the direction of pressure upon said pressure operated means thereby to withdraw the hammer dog from the engaged log when advanced laterally to a predetermined position, the lateral retraction of said fluid operated means operating to return said means to operative condition.

10. The combination with a saw mill carriage, of a knee supported thereon, means for feeding or retracting said knee laterally relative to the path of movement of the carriage, a hammer dog movably connected to the knee and movable therewith, fluid pressure operated means for shifting said dog into engagement with a log adjacent to the knee, means for automatically reversing the action of the fluid pressure operated means when the knee is advanced to a predetermined position, thereby to withdraw the dog from engagement with the log, the lateral retraction of the knee and dog toward initial position operating to return said fluid pressure operated means to operative condition.

11. The combination with a saw mill carriage, of a knee movably mounted thereon, means for advancing and retracting the knee laterally relative to the path of movement of the carriage, a hammer dog movable with the knee and movable relative thereto, fluid pressure operated means for shifting said dog into engagement with a log adjacent the knee, adjustable means controlled by the advance movement of the knee and dog to a predetermined position for actuating said fluid pressure operating means to withdraw the dog from engagement with the log, said adjustable means operating to return the fluid pressure operated means to operative condition upon the lateral retraction of the knee and dog.

In testimony that I claim the foregoing as my own, I have hereto affixed my signature.

JAMES M. BROPHY.